United States Patent
Brothers et al.

(10) Patent No.: US 10,460,230 B2
(45) Date of Patent: Oct. 29, 2019

(54) REDUCING COMPUTATIONS IN A NEURAL NETWORK

(71) Applicant: Samsung Electronics Co., Ltd., Gyeonggi-Do (KR)

(72) Inventors: John W. Brothers, Calistoga, CA (US); Joohoon Lee, East Palo Alto, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 814 days.

(21) Appl. No.: 15/014,686

(22) Filed: Feb. 3, 2016

(65) Prior Publication Data

US 2016/0358068 A1 Dec. 8, 2016

Related U.S. Application Data (60) Provisional application No. 62/171,172, filed on Jun. 4, 2015, provisional application No. 62/174,472, filed on Jun. 11, 2015.

(51) Int. Cl.
  *G06N 3/04* (2006.01)
  *G06N 3/08* (2006.01)
(52) U.S. Cl.
  CPC ........ *G06N 3/0454* (2013.01); *G06N 3/082* (2013.01)
(58) Field of Classification Search
  CPC ........ G06T 2207/20084; G06N 3/0454; G06N 3/082
  See application file for complete search history.

(56) References Cited

U.S. PATENT DOCUMENTS

| | | |
|---|---|---|
| 6,125,194 A | 9/2000 | Yeh et al. |
| 7,308,134 B2 | 12/2007 | Wersing et al. |
| 7,490,071 B2 | 2/2009 | Milenova et al. |
| 8,209,269 B2 | 6/2012 | Schoelkopf et al. |
| 8,452,109 B2 | 5/2013 | Alldrin et al. |
| 8,532,753 B2 | 9/2013 | Makdissi |
| 8,832,004 B2 | 9/2014 | Kato et al. |
| 8,872,909 B2 | 10/2014 | Kumar et al. |
| 8,873,838 B2 | 10/2014 | Suleyman et al. |
| 2003/0002731 A1 | 1/2003 | Wersing et al. |
| 2010/0316283 A1 | 12/2010 | Greer |

(Continued)

OTHER PUBLICATIONS

Jaderberg, Max, Andrea Vedaldi, and Andrew Zisserman. "Speeding up convolutional neural networks with low rank expansions." arXiv preprint arXiv:1405.3866 (2014). (Year: 2014).*

(Continued)

*Primary Examiner* — Li B. Zhen
*Assistant Examiner* — Markus A Vasquez
(74) *Attorney, Agent, or Firm* — Remaissance IP Law Group LLP

(57) ABSTRACT

Reducing computations in a neural network may include determining a group including a plurality of convolution kernels of a convolution stage of a neural network. The convolution kernels of the group are similar to one another. A base convolution kernel for the group may be determined. Scaling factors for a plurality of input feature maps processed by the group may be calculated. The convolution stage of the neural network may be modified to calculate a composite input feature map using the scaling factors and apply the base convolution kernel to the composite input feature map.

14 Claims, 3 Drawing Sheets

(56) References Cited

U.S. PATENT DOCUMENTS

| | | |
|---|---|---|
| 2012/0078099 A1 | 3/2012 | Suri |
| 2014/0357312 A1 | 12/2014 | Davis et al. |
| 2015/0125049 A1 | 5/2015 | Taigman et al. |
| 2015/0161995 A1 | 6/2015 | Sainath et al. |
| 2015/0193718 A1 | 7/2015 | Shaburov et al. |

OTHER PUBLICATIONS

Denton, Emily L., et al. "Exploiting linear structure within convolutional networks for efficient evaluation." Advances in neural information processing systems. 2014. (Year: 2014).*

Gruber, Peter, and Fabian J. Theis. "Grassmann clustering." Signal Processing Conference, 2006 14th European. IEEE, 2006. (Year: 2006).*

Pennec, Xavier, Pierre Fillard, and Nicholas Ayache. "A Riemannian framework for tensor computing." International Journal of computer vision 66.1 (2006): 41-66. (Year: 2006).*

Park, Hae-Sang, and Chi-Hyuck Jun. "A simple and fast algorithm for K-medoids clustering." Expert systems with applications 36.2 (2009): 3336-3341. (Year: 2009).*

Lebedev, Vadim, et al. "Speeding-up convolutional neural networks using fine-tuned cp-decomposition." arXiv preprint arXiv: 1412.6553 (2015). (Year: 2015).*

Kim, Yong-Deok, et al. "Compression of deep convolutional neural networks for fast and low power mobile applications." arXiv preprint arXiv:1511.06530 (2015). (Year: 2015).*

\* cited by examiner

REDUCING COMPUTATIONS IN A NEURAL NETWORK

CROSS-REFERENCE TO RELATED APPLICATIONS

This application claims the benefit of U.S. Provisional Patent Application No. 62/171,172 filed on Jun. 4, 2015, which is fully incorporated herein by reference, and U.S. Provisional Patent Application No. 62/174,472 filed on Jun. 11, 2015, which is also fully incorporated herein by reference.

TECHNICAL FIELD

This disclosure relates to neural networks and, more particularly, to reducing computations in neural networks.

BACKGROUND

Neural networks refer to a computational architecture modeled after biological brains. Within a neural network, nodes referred to as neurons may be interconnected and operate collectively to process input data. Examples of different types of neural networks include, but are not limited to, Convolutional Neural Networks, Recurrent Neural Networks, Deep Belief Networks, Restricted Boltzman Machines, etc. In a feedforward neural network, the neurons of the neural network have links to other neurons. The links only extend in one direction, i.e., the forward direction, through the neural network.

A neural network may be used to extract "features" from complex input data. The neural network may include a plurality of layers. Each layer may receive input data and generate output data by processing the input data to the layer. The output data may be a feature map of the input data that the neural network generates by convolving an input image or a feature map with convolution kernels. Initial layers of a neural network may be operative to extract low level features such as edges and/or gradients from an input such as an image. Subsequent layers of the neural network may extract progressively more complex features such as eyes, a nose, or the like.

SUMMARY

One embodiment may include a method. The method may include determining a group including a plurality of convolution kernels of a convolution stage of a neural network. The convolution kernels of the group are similar to one another. The method may include determining a base convolution kernel for the group and determining scaling factors for a plurality of input feature maps processed by the group. The method may also include modifying the convolution stage to calculate a composite input feature map using the scaling factors and apply the base convolution kernel to the composite input feature map.

Another embodiment may include a system. The system may include a processor programmed to initiate executable operations. The executable operations may include determining a group including a plurality of convolution kernels of a convolution stage of a neural network. The convolution kernels of the group are similar to one another. The executable operations may include determining a base convolution kernel for the group and determining scaling factors for a plurality of input feature maps processed by the group. The executable operations may also include modifying the convolution stage to calculate a composite input feature map using the scaling factors and apply the base convolution kernel to the composite input feature map.

Another embodiment may include a non-transitory computer-readable storage medium having instructions stored thereon which, when executed by a processor, perform a method. The method may include determining a group including a plurality of convolution kernels of a convolution stage of a neural network. The convolution kernels of the group are similar to one another. The method may include determining a base convolution kernel for the group and determining scaling factors for a plurality of input feature maps processed by the group. The method may also include modifying the convolution stage to calculate a composite input feature map using the scaling factors and apply the base convolution kernel to the composite input feature map.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

DETAILED DESCRIPTION

While the disclosure concludes with claims defining novel features, it is believed that the various features described herein will be better understood from a consideration of the description in conjunction with the drawings. The process (es), machine(s), manufacture(s), and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to neural networks and, more particularly, to reducing computations in neural networks. For example, during execution, a neural network performs a significant number of convolutions to extract features. The convolutions are typically implemented as multiply-accumulate (MAC) operations. In some cases, as much as 90% of the computational cost in terms of runtime, power consumption, and/or area usage, e.g., in the case of an integrated circuit, may be devoted to implementing and/or performing these MAC operations. Example embodiments disclosed herein can reduce the amount of computations, power, and/or time involved with executing the neural network.

In accordance with the inventive arrangements disclosed herein, convolution kernels of a neural network may be evaluated. The convolution kernels may be evaluated to identify groups of convolution kernels considered to be similar. As defined within this disclosure, "similar" convolution kernels are convolution kernels that satisfy one or more similarity criteria that indicates that the kernels are scaled equivalents of each other, are approximately scaled equivalents of each other, are linear transformations of each other, are approximately linear transformations of each other, are affine transformations of each other, or are approximately affine transformations of each other. In the case where a group of similar convolution kernels is identified, the convolution kernels in the group may be replaced within the neural network with a base convolution kernel. Further, scaling factors may be determined and applied to the input feature maps.

In a number of neural networks, for a given convolution layer of a neural network, a number, e.g., "M," of input feature maps are processed to generate a number, e.g., "N," of output feature maps. For each output feature map generated by the convolution layer, each of the input feature maps may be processed by a different convolution kernel and then summed. In accordance with the inventive arrangements described herein, the input feature maps determined to be processed by a group of similar convolution kernels may be scaled using the scaling factors. The scaled input feature maps may be summed to generate a composite input feature map. The convolution kernels of the group, i.e., those determined to be similar, may be replaced with the base convolution kernel. Accordingly, when the modified neural network is executed, rather than execute each of the convolution kernels of the group to process an input feature map, the neural network may apply the base convolution kernel to the composite input feature map to generate the output feature map, or a portion of an output feature map.

The embodiments described herein may be used to form more than one group within a convolution layer of a neural network. Further, the embodiments may be applied across a plurality of different convolution layers in the neural network. As such, the number of convolution operations performed when executing a neural network, once modified as described herein, may be significantly reduced.

Figure 1:
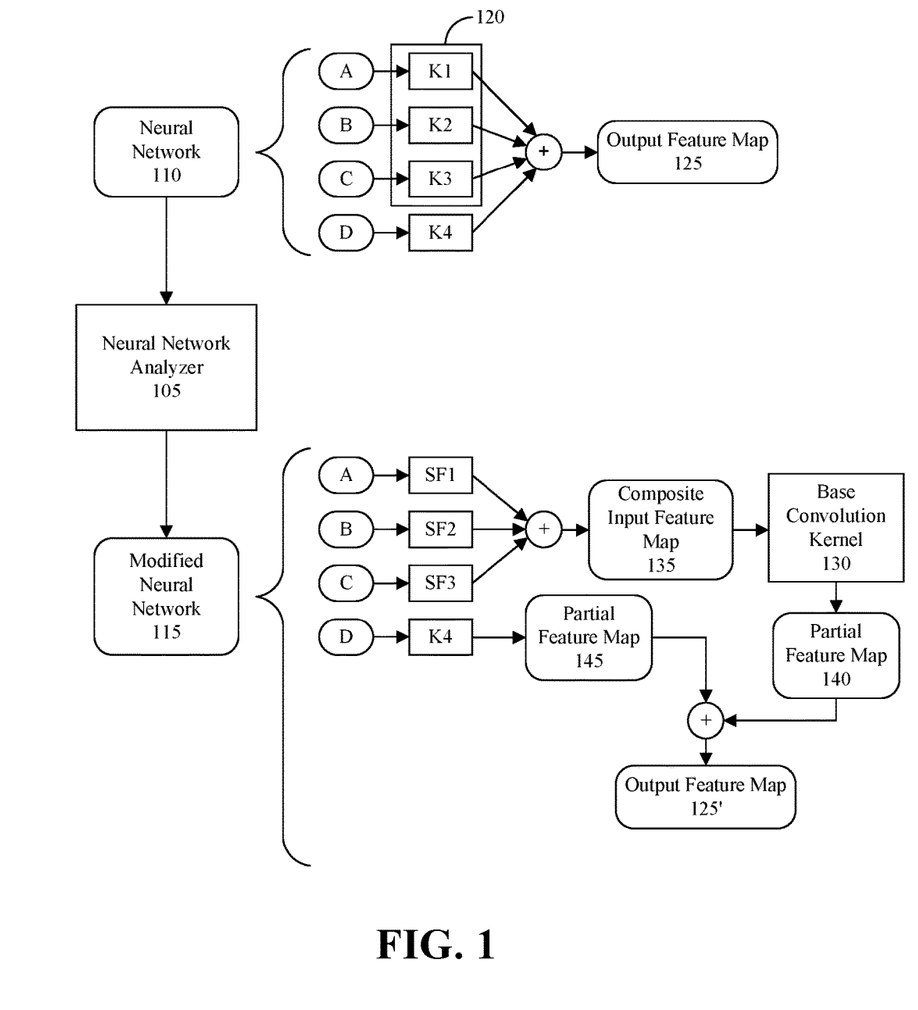
FIG. 1 is a block diagram illustrating an exemplary neural network analyzer.

FIG. 1 is a block diagram illustrating operation of an exemplary neural network analyzer 105. Neural network analyzer 105 may be implemented as a data processing system executing suitable software. As pictured, neural network analyzer 105 may receive a neural network 110 as an input. Neural network 110 may be a trained neural network. Neural network analyzer 105 may operate on neural network 110 and generate a modified version of neural network 110 as an output shown in FIG. 1 as modified neural network 115.

For purposes of illustration, consider an example where neural network 110 includes, at least in part, two sets of 192 convolution kernels. The convolution kernels are 3×3. In this example, neural network 110 is trained without any constraints for determining correlations with other convolution kernels. The modified version of the input neural network generated by neural network analyzer 105, i.e., modified neural network 115, will not include the identical 2 sets of 192 convolution kernels. Rather, modified neural network 115 will include one or more base convolution kernels and scaling factors.

In one arrangement, neural network analyzer 105 may process convolution kernels within neural network 110. In general, neural network analyzer 105 may identify groups of convolution kernels from neural network 110 that are considered similar, for example, based on a similarity criterion. More particularly, neural network analyzer 105 may identify one or more groups of similar convolution kernels from one or more convolution layers of neural network 110.

In the example of FIG. 1, neural network 110 includes a convolution layer in which input feature maps A, B, C, and D are processed by convolution kernels K1, K2, K3, and K4 respectively. Neural network analyzer 105 has determined that convolution kernels K1, K2, and K3 are similar and formed a group 120. The results of applying convolution kernels K1, K2, K3, and K4 are summed to generate an output feature map 125. In this example, output feature map 125 may be represented by the expression: A*K1+B*K2+C*K3+D*K4.

The same convolution layer described for neural network 110 is also shown for modified neural network 115 post processing by neural network analyzer 105. As pictured, the convolution layer is modified so that each of input feature maps A, B, and C, which belong to group 120, is multiplied by a scaling factor shown as SF1, SF2, and SF3. The scaled results are summed to generate a composite input feature map 135. Composite input feature map 135 may be expressed as SF1(A)+SF2(B)+SF3(C). Composite input feature map 135 is provided to base convolution kernel 130.

Base convolution kernel 130 is applied to composite input feature map 135 to generate partial feature map 140. Partial feature map 140 may be expressed as [SF1(A)+SF2(B)+SF3(C)]*BK, where "BK" is base convolution kernel 130. Convolution kernel K4, which is not similar to convolution kernels K1, K2, or K3, remains and is independently applied to input feature map D to generate partial feature map 145. Partial feature map 145 may be expressed as D*K4. Partial feature map 145 may be provided to the adder and summed with partial feature map 140 to generate output feature map 125'.

In the case where the convolution kernels K1, K2, and K3 are similar and scaled equivalents or transformations (hereafter collectively "scaled equivalents") of base convolution kernel 130, output feature map 125' is equivalent to output feature map 125. In the case where one or more or all of convolution kernels K1, K2, and K3 are similar but are approximate equivalents or approximate transformations (hereafter collectively referred to as "approximate equivalents") of base convolution kernel 130, then output feature map 125' is an approximation of output feature map 125. In any case, rather than perform a separate convolution operation for each of input feature maps A, B, and C, the input feature maps are scaled and summed to generate composite feature map 135, that may then be convolved with base convolution kernel 130. In general, neural network analyzer 105 may replace each of the convolution kernels of a group, e.g., convolution kernels K1, K2, and K3 of group 120, with a single instance of the base convolution kernel for the group.

In many cases, a neural network generates a feature map for a next layer by convolving multiple feature maps from the previous layer with convolution kernels. The results are then summed. Each input feature map may be used multiple times to generate several or all feature maps in the next layer. The relative importance of each input feature map is effectively folded into the convolution matrix applied to that feature map for a given output feature map. As such, the convolutions applied to a given feature map are often scaled versions of each other or approximately scaled versions of each other.

Neural network analyzer 105 may leverage this characteristic by detecting these instances of similar convolution kernels and applying an optimization that may significantly reduce the number of multiply-accumulate (MAC) operations performed when executing the modified neural network. For example, referring to neural network 110, in the case where the convolution kernels utilize a 3×3 convolution matrix, applying convolutions kernels K1, K2, and K3 would result in 27 (3×3×3) multiplies and adds. In the case of modified neural network 115, processing input feature maps A, B, and C through the modified convolution layer results in 12 (1+1+1+3×3) multiplies and adds. In general, the larger the number of input maps in the group and/or the larger the convolution matrix dimensions, the more significant the reduction in operations. Modified neural network 115 may consume less power and execute faster than neural network 110 with the same or nearly the same accuracy.

In general, FIG. 1 illustrates that after a neural network is trained and the convolution weights are determined, groups of similar convolution kernels are identified. Further, one or more base convolution kernels and scaling factors may be computed. The scaling factors and base convolution kernels may be used directly to execute the neural network as an approximation of the original trained neural network. In another aspect, retraining may be performed on the re-parameterized neural network. As part of the retraining, the neural network may be redefined in terms of base convolution kernels, scaling factors, and the convolution weights. The weights of the base convolution kernels and the scaling factors may be refined as a result of the retraining. In addition, other network parameters such as the weights of the fully connected layers may be refined. The result of the retraining may be a neural network that is a close approximation of the original neural network. The resulting neural network may be slightly less accurate or slightly more accurate, but may maintain the computational efficiencies of using the base convolution kernel(s) and scaling factors instead of the original separate convolution kernels.

Figure 2:
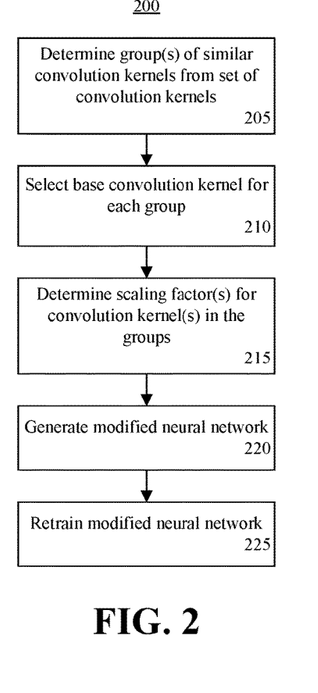
FIG. 2 is a flow chart illustrating a method of processing a neural network.

FIG. 2 is a flow chart illustrating a method 200 of processing a neural network. Method 200 may be performed by neural network analyzer 105 described with reference to FIG. 1 and referred to herein with reference to FIGS. 2 and 3 as "the system." In general, the system may process the neural network and generate a modified version of the neural network as an output as an offline process. An offline process is one that is performed while not executing the neural network for inferencing. Accordingly, method 200 may begin in a state where the system has identified a neural network as an input for processing. The neural network being processed may be one that has been trained.

For example, the neural network that is processed may be trained to a point where the weights of the neural network have converged or substantially converged. In particular, a training process has determined a set of weights (e.g., convolution kernels) that provides the neural network with the desired input-output relationship. To this end, a learning process adjusts the weights of the neural network to change the input-output relationship so that an input-output accuracy cost function is optimized. In this way, the goal of a training process is to change the input-output relationship of the neural network. Computational efficiency may not be a consideration during the training process. Example embodiments of method 200, in contrast, facilitate optimizing the computational efficiency of the trained neural network while substantially maintaining the same input-output relationship of the trained neural network. In some cases, example embodiments may sacrifice input-output accuracy for better computational efficiency.

In block 205, the system may determine one or more groups of similar convolution kernels from a set of convolution kernels of the neural network. For example, the system may determine one or more groups of similar convolution kernels for a particular convolution layer of the neural network. It should be appreciated, however, that the system may process one or more or all convolution layers of the neural network to determine groups of similar convolution kernels. Each group of convolution kernels includes only convolution kernels of a same convolution layer of the neural network.

In one aspect, the system may form groups of similar convolution kernels using any of a variety of known clustering techniques intended for use in cases where the number of groups to be formed is not known at the outset. In general, the distance of a particular convolution kernel to the center of the group, or cluster, may be used as the similarity metric. An example method of implementing block 205 is described in greater detail in connection with FIG. 3.

In block 210, the system may determine a base convolution kernel for each group of similar convolution kernels. In one aspect, the base convolution kernel may be one of the convolution kernels of the group. For example, the system may calculate a base selection metric for each of the convolution kernels in a group. The system may utilize the base selection metric to select the base convolution kernel for the group from among the convolution kernels of the group.

In one example, the base selection metric may be a measure of the size of weights of the convolution kernels in the group. Since each convolution kernel of the group may be a scaled equivalent or an approximate equivalent, of each other member of the group, the system may select the convolution kernel with the smallest weights, the convolution kernel with the largest weights, or another convolution kernel with mid-level weights as the base convolution kernel for the group.

In illustration, consider an exemplary group including convolution kernels K1, K2, and K3. In this example, convolution kernel K1 may have the smallest weights. Convolution kernel K2 may have weights of 2.3 times the weights of convolution kernel K1. Convolution kernel K3 may have weights that are 3 times the weights of convolution kernel K1. The system may select convolution kernel K1, convolution kernel K2, or convolution kernel K3 as the base convolution kernel depending upon the base selection metric.

In another example, the system may use mean weight as the base selection metric. For example, the system may select the convolution kernel with the largest mean weight as the base convolution kernel. Continuing with the prior example, convolution kernel K1 may have a mean component weight of 0.462. Convolution kernel K2 may have a mean component weight of 0.165. Convolution kernel K3 may have a mean component weight of 0.237. In this example, the system may select convolution kernel K1 as the base convolution kernel.

In another aspect, the base convolution kernel may be determined as a function of the convolution kernels of the group. For example, the system may determine an average, or weighted average, of the convolution kernels in the group.

In the exemplary group including convolution kernels K1, K2, and K3, the system may calculate an average of convolution kernels K1, K2, and K3 as the base convolution kernel. Other techniques may be used to determine a base convolution kernel. For instance, the base convolution kernel of a group of similar convolution kernels may be determined to minimize error. As an example, the base convolution kernel of a group may be determined such that the result is within a predetermined range of the result of applying the original separate convolutions. The inventive arrangements described herein are not intended to be limited by the particular examples provided for determining base convolution kernels for the groups.

In block 215, the system may determine scaling factors for the convolution kernels in the groups. For each convolution kernel in a group, the system may calculate a scaling factor. The scaling factor is applied to the input feature map provided to the convolution kernel for which the scaling factor is determined. Scaling factor application is generally described with reference to FIG. 1 to generate the composite input feature map.

Consider the example where the group includes convolution kernels K1, K2, and K3. Convolution kernel K1 may have the smallest weights. Convolution kernel K2 may have weights of 2.3 times the weights of convolution kernel K1. Convolution kernel K3 may have weights that are 3 times the weights of convolution kernel K1. The system may select convolution kernel K1 as the base convolution kernel. In that case, the system determines the scaling factor for convolution kernel K1 to be 1 (or apply no scaling factor). The system determines the scaling factor for convolution kernel K2 as 2.3. The system determines the scaling factor for convolution kernel K3 to be 3. In an example where the system selects convolution kernel K3 as the base convolution kernel, the system may determine that the scaling factors to be applied to the input feature maps provided to convolution kernels K1, K2 and K3 may be 1/3, 1/2.3, and 1, respectively.

In still another example, where the system determines a base convolution kernel as an average or a weighted average of the convolution kernels K1, K2, and K3, the system may determine scaling factors to adjust some convolution kernel weights up and other convolution kernel weights down to reduce the average error.

In block 220, the system may generate the modified neural network. The system may modify the convolution layers, on a per group basis, to generate the input composite feature maps using the scaling factors and replace the convolution kernels of the group with a single instance of the base convolution kernel for the group. It should be appreciated that the base convolution kernel may be applied to the composite input feature map generated using the scaling factors in lieu of applying the plurality of convolution kernels of the group. A single instance of the base convolution kernel may be applied to the composite input feature map. As discussed, the system may perform the operations described in blocks 205, 210, 215, and 220 for a particular convolution layer, for a plurality of convolution layers, or across all convolution layers of the neural network. The modified neural network may be output and stored for subsequent use.

In block 225, the system may optionally retrain the modified neural network. The retrained and modified neural network may be output and stored for subsequent use. In one aspect, the system may or may not retrain the modified neural network based upon a user specified setting. In another aspect, the system may retrain the modified neural network responsive to detecting a retraining condition. For example, an accuracy threshold may be set within the system. The system may compare the accuracy of the modified neural network to the accuracy of the original neural network provided as input. Responsive to determining that the accuracy of the modified neural network decreases from that of the original neural network more than the accuracy threshold, the system may retrain the modified neural network. In one exemplary implementation, the accuracy threshold may be set to 2%. Accordingly, in that case, the system retrains the modified neural network responsive to determining that the accuracy of the modified neural network is at least 2% worse than the accuracy of the original neural network. It should be appreciated that the particular value of 2% is provided for purposes of illustration only. Other values may be used. Further, the particular accuracy threshold used may be a user specified preference within the system.

In one aspect, the system may retrain the modified neural network with one or more constraints in place that prevent changes to the groups established in method 200. For example, the constraints may keep the established groups of similar convolution kernels intact. In this regard, membership of the groups in terms of which convolution kernels are in the various groups may remain unchanged. It should be appreciated, however, that some aspects of the groups such as the base convolution kernels (e.g., weights) and/or scaling factors may be modified without changing membership in the groups. As such, weights of base convolution kernels and/or scaling factors may be adjusted during a retraining process.

In an embodiment, the system may implement retraining as an offline process. The retraining process may involve forward propagation and error back-propagation. For example, the system may enforce a constraint by implementing forward propagation using the base convolution kernel for the modified set of convolution kernels. The system may perform back-propagation so that the gradient descent has no effect on the constraint (i.e., base convolution kernel) while still updating the other convolution kernels.

In another arrangement, the modified neural network may be used without retraining. Use of the modified neural network may result in some loss of accuracy as compared to use of the neural network received as input. Loss of accuracy in the modified neural network may be controlled by adjusting the threshold used to determine whether convolution kernels are similar and, as such, within the same group. By increasing the threshold, for example, the system may generate fewer groups. Further, the number of operations required to compute convolutions will decrease proportionally.

As an illustrative example, consider the case where 128 input feature maps contribute to 128 output feature maps in the next convolution layer of the neural network. The input feature maps that contribute to a particular output feature map may be grouped. The grouping of input feature maps may differ for each of the output feature maps. As such, in this case, there may be 128 different groupings of input feature maps (e.g., one grouping for each output feature map). In this example, 128 convolution kernels in the convolution layer of the neural network may be grouped into 32 groups. In that case, the number of convolutions required for the convolution layer in the modified neural network may be reduced by $32/128$ or $1/4$. Since approximately 80% of the mathematical operations in the neural network are related to convolutions, the optimization described above may result in a reduction of approximately 60% of the mathematical operations performed to process the feature map.

Figure 3:
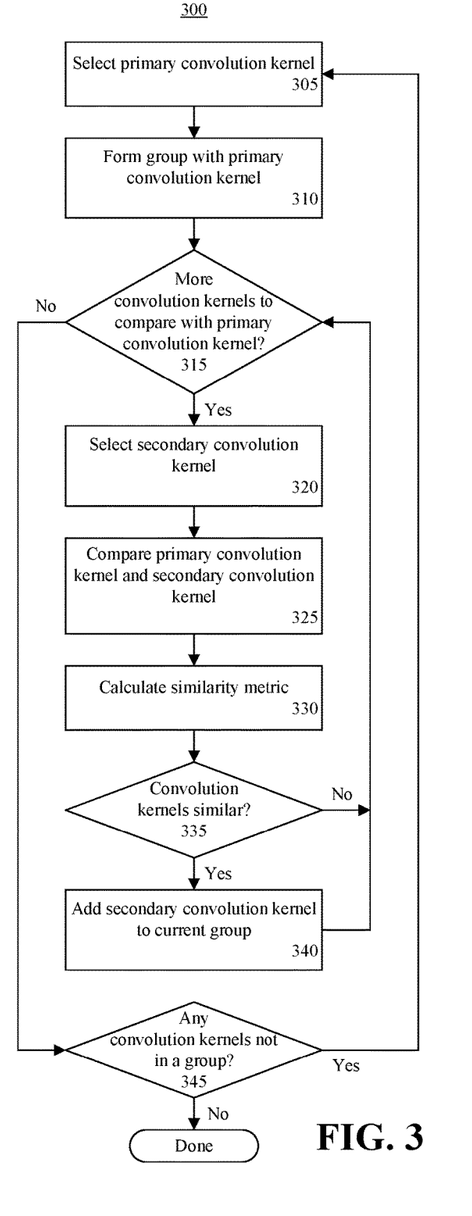
FIG. 3 is a flow chart illustrating an exemplary method of determining groups of convolution kernels.

FIG. 3 is a flow chart illustrating an exemplary method 300 of determining groups of convolution kernels. In one arrangement, FIG. 3 may be an exemplary implementation of block 205 of FIG. 2. FIG. 3 is described from the perspective of processing convolution kernels of a single convolution layer. It should be appreciated, however, that method 300 may be performed in an iterative manner to process one or more other convolution layers of a neural network to determine groups.

In block 305, the system may select a convolution kernel as a primary convolution kernel. The system may select a convolution kernel from the convolution kernels of a convolution layer to be the primary convolution kernel. The term "primary" is used only to differentiate one convolution kernel from another within the same convolution layer. In one aspect, the system may select a convolution kernel according to component size. For a given set of convolution kernels in a convolution layer, for example, the system may select one convolution kernel from the set according to component size. The primary convolution kernel may be used for purposes of grouping and determining convolution kernel similarity.

For example, a convolution layer of a neural network may include three convolution kernels K1, K2, and K3 that are to be applied to generate an output feature map for a next convolution layer of the neural network. Convolution kernels K1, K2, and K3 are shown below in Tables 1, 2, and 3, respectively. In this example, the convolution kernels are 3×3.

TABLE 1

Convolution Kernel K1

| 0.278 | 0.803 | 0.340 |
|---|---|---|
| 0.398 | 0.937 | 0.432 |
| 0.202 | 0.547 | 0.219 |

TABLE 2

Convolution Kernel K2

| 0.099 | 0.290 | 0.111 |
|---|---|---|
| 0.152 | 0.318 | 0.165 |
| 0.072 | 0.203 | 0.074 |

TABLE 3

Convolution Kernel K3

| 0.029 | 0.178 | 0.061 |
|---|---|---|
| 0.043 | 0.115 | 0.097 |
| 0.030 | 0.107 | 0.049 |

In one arrangement, the system may select the convolution kernel having the largest component size. In this example, the system may select convolution kernel K1 since the component 0.937 is larger than any other component of convolution kernels K2 and K3. Accordingly, in this example, convolution kernel K1 is selected as the primary convolution kernel.

In block 310, the system may form a group with the primary convolution kernel. The system may create a new group that includes, at least initially, only the primary convolution kernel. In this example, the system may form a group that includes convolution kernel K1. In block 315, the system may determine whether there are more convolution kernels that have not yet been compared with the primary convolution kernel. If so, method 300 may continue to block 320. If not, method 300 may proceed to block 345.

In block 320, the system may select a secondary convolution kernel. The term "secondary" is only intended to differentiate one convolution kernel from another and from the primary convolution kernel. For purposes of illustration, the system may select convolution kernel K2 as the secondary convolution kernel. It should be appreciated, however, that the system may select any other convolution kernel of the convolution layer not yet compared with the primary convolution kernel and not yet placed into a group.

In block 325, the system may compare the primary convolution kernel and the secondary convolution kernel. For example, the system may calculate a ratio of the primary convolution kernel to the secondary convolution kernel. Continuing with the prior example, the system may calculate a ratio of convolution kernel K1 (primary) to convolution kernel K2 (secondary) by dividing convolution kernel K1 by convolution kernel K2. The resulting ratio is shown below in Table 4.

TABLE 4

Convolution Kernel K1 divided by Convolution Kernel K2

| 2.80 | 2.77 | 3.07 |
|---|---|---|
| 2.61 | 2.95 | 2.62 |
| 2.80 | 2.70 | 2.95 |

In block 330, the system may calculate a similarity metric for the comparison made in block 325. For example, the system may determine the similarity metric based, at least in part, on the ratio determined in block 325. The similarity metric may be compared to a similarity criterion to determine whether the primary and secondary convolution kernels are similar. As an illustrative example, one or more metrics such as a mean, a minimum, a maximum, a standard deviation, or the like may be calculated for the ratio and used as the similarity metric. In another example, a combination of metrics may be used as the similarity metric. It should be appreciated that the system may use any of a variety of different metrics and/or combinations of such metrics to determine whether two convolution kernels are similar. Table 5 below illustrates exemplary similarity metrics that may be calculated for the ratio of convolution kernel K1/convolution kernel K2.

TABLE 5

| Ratio | Mean | Min | Max | Standard Deviation |
|---|---|---|---|---|
| K1/K2 | 2.84 | 2.62 | 3.14 | 0.19 |

In block 335, the system may determine whether the primary and secondary convolution kernels used to calculate the ratio are similar. The system may compare the similarity metric determined from the ratio with a similarity criterion to determine whether the convolution kernels are similar. The system may determine that each set of convolution kernels with a similarity metric that meets the similarity criterion are similar.

For purposes of illustration, the system may use standard deviation as the similarity metric and a threshold as the similarity criterion. The system may determine that the similarity metric meets the similarity criterion when the standard deviation of a ratio is less than or equal to the threshold. Continuing with the example above, the threshold may be set to 0.20. Accordingly, the system may determine that the primary convolution kernel K1 is related to the secondary convolution kernel K2 since the standard deviation of the ratio of convolution kernel K1 to convolution kernel K2 is 0.19 and less than 0.20.

If the system determines that the convolution kernels are similar, method 300 may continue to block 340. If not, method 300 may loop back to block 315 to continue comparing further convolution kernels of the convolution layer with the current primary convolution kernel. In block 340, the system may add the secondary convolution kernel to the current group which is the group that includes the primary convolution kernel. Accordingly, the system adds convolution kernel K2 to the group that includes convolution kernel K1. After block 340, method 300 may loop back to block 315 to continue processing.

In block 315, the system may again determine whether there are more convolution kernels that have not yet been compared with the primary convolution kernel. In this example, the system may determine that convolution kernel K3 has not yet been compared with convolution kernel K1 and proceed to block 320, where convolution kernel K3 may be selected as the secondary convolution kernel.

In block 325, the system may calculate the ratio of convolution kernel K1 divided by convolution kernel K3. The calculated ratio is shown below as Table 6.

TABLE 6

| Convolution Kernel K1 divided by Convolution Kernel K3 | | |
| --- | --- | --- |
| 7.61 | 6.63 | 5.54 |
| 6.40 | 6.38 | 7.61 |
| 7.42 | 9.56 | 6.49 |

In block 330, the system may calculate the similarity metric for the ratio. For example, the system may determine that the ratio of convolution kernel K1 to convolution kernel K3 has a standard deviation of 1.09 and, as such, determine that the two convolution kernels are not similar in block 335. Accordingly, the system does not add convolution kernel K3 to the current group, i.e., the group with convolution kernel K1 and convolution kernel K2.

In the next iteration through block 315, the system may determine that there are no further convolution kernels available to compare with the primary convolution kernel. Accordingly, method 300 may proceed to block 345. In block 345, the system may determine whether there are any convolution kernels of the convolution layer that are not yet assigned to a group. If so, method 300 may loop back to block 305 to select a convolution kernel not in a group as the primary convolution kernel. If the convolution kernels of the convolution layer are all in groups, method 300 may end.

In looping back to block 305, and continuing with the example, the system may select convolution kernel K3 as the primary convolution kernel. In one arrangement, the system may use the same selection criteria as previously used to select the primary convolution kernel. For example, the system may select the convolution kernel not yet in a group with the largest component.

In block 310, the system may form a group that includes convolution kernel K3. In block 315, the system may determine that there are no other convolution kernels to compare with the primary convolution kernel and proceed to block 345. In block 345, since all of the convolution kernels have been assigned to groups, method 300 may end.

Using the exemplary weights for convolution kernels K1 and K2 from Tables 1 and 2, the system may calculate scaling factors as described with reference to block 215 of FIG. 2. In this example, since convolution kernel K1 is used as the base convolution kernel, the system need only calculate a scaling factor for convolution kernel K2. The system may calculate a scaling factor of 0.3513 for convolution kernel K2. For purposes of illustration, taking base convolution kernel K1 and scaling the components using the scaling factor of 0.3513 results in an approximation of convolution kernel K2 shown below in Table 7.

TABLE 7

| Approximation of Convolution Kernel K2 | | |
| --- | --- | --- |
| 0.098 | 0.284 | 0.120 |
| 0.141 | 0.332 | 0.153 |
| 0.071 | 0.194 | 0.078 |

By applying the scaling factor to the input feature map provided to convolution kernel K2, the contribution of convolution kernel K2 can be accounted for in the composite input feature map. The accuracy of the approximation of using the scaling factor for convolution kernel K2 and the base convolution kernel for the group is shown below in Table 8.

TABLE 8

| 98.0% | 104.0% | 104.0% |
| --- | --- | --- |
| 94.9% | 91.4% | 107.5% |
| 96.1% | 104.9% | 99.2% |

In another arrangement, the system may search for convolution kernels in which all components are less than a specified threshold. Any convolution kernels identified with all components less than the threshold may be assigned to a "skip group." In general, the convolution kernels in the "skip group" may be determined by the system to have little, if any, effect on the output feature maps that are generated. As noted, groups may be formed using a clustering technique.

In one aspect, for example, a network pruning process may be applied. An indicator may be created within the neural network that, when detected by a neural network accelerator, causes the neural network accelerator to skip over the indicated group of convolutions. Skipping, as described, allows the neural network accelerator to execute in fewer cycles. The skip-group results are effectively multiplying and accumulating zero to the output, which has no effect.

In another aspect, the neural network may have been pruned prior to performing the grouping process. In that case, the kernel weights below some threshold may be set to zero. Alternatively, weight pruning may be performed after forming groups. In that case, the individual weights in the base kernels may be set to zero when the individual weights are below some threshold magnitude.

The example provided in FIG. 3 is not intended to limit the inventive arrangements described within this disclosure to one particular type of clustering technique. In another example, the system may compare new candidate convolution kernels to the weighted average of the existing group rather than to the primary kernel. With reference to the example of FIG. 3, the primary convolution is likely to be the logical centroid of the cluster. Accordingly, comparison of the secondary convolution kernel to the primary convolution kernel is an example of using the similarity criterion and/or metric of distance to the group center.

Figure 4:
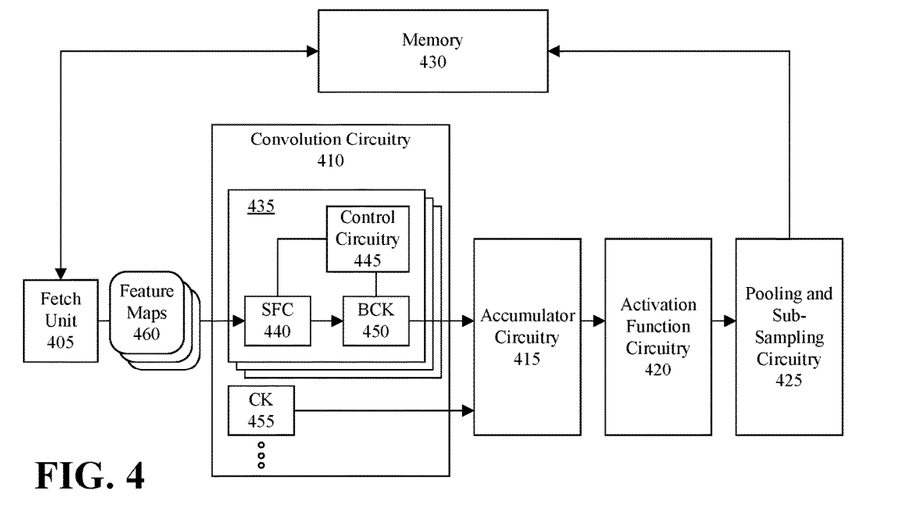
FIG. 4 is a block diagram illustrating an exemplary architecture for a neural network accelerator.

FIG. 4 is a block diagram illustrating an exemplary architecture for a neural network accelerator. FIG. 4 illustrates exemplary circuitry that may be used to implement one or more convolution layers of a modified neural network as described herein and as implemented within a neural network accelerator. As pictured, the convolution layer may include a fetch unit 405, convolution circuitry 410, accumulator circuitry 415, activation function circuitry 420, pooling and sub-sampling circuitry 425, and a memory 430.

Fetch unit 405 may retrieve, or fetch, feature maps such as feature maps 460 from memory 430 for processing. Fetch unit may provide feature maps to convolution circuitry 410. Convolution circuitry 410 may include one or more groups 435. As pictured, group 435 may include scaling factor circuitry (shown as "SFC") 440, control circuitry 445, and a base convolution kernel (shown as "BCF") 450. Convolution circuitry may include additional convolution kernels 455 as shown.

Convolution kernels 455 may be convolution kernels that are not in a group or are part of groups that include only one convolution kernel. Operation of groups with a single convolution kernel may be performed as generally known for a convolution layer.

In one aspect, control circuitry 445 may control operation of scaling factor circuitry 440 and base convolution kernel 450 in each group 435. Scaling factor circuitry 440, for example, may apply scaling factors to received input feature maps as described. Scaling factor circuitry 440 may also sum the scaled input feature maps to generate the composite input feature map. Scaling factor circuitry 440, under control of control circuitry 445, may provide the composite input feature map to base convolution kernel 450 for processing. Base convolution kernel 450 may perform convolution on the received composite input feature map to generate a partial result. Convolution kernel 455 may also generate a partial result. Partial results from convolution kernel(s) 455 and from groups 435 may be provided to accumulator circuitry 415 for processing.

Accumulator circuitry 415 may add the partial results received from convolution circuitry 410. Activation function circuitry 420 may receive the accumulated result from accumulator circuitry 415. Activation function circuitry 420 may apply the activation function to the accumulated result and provide an output to pooling and sub-sampling circuitry 425. Pooling and sub-sampling circuitry 425 may output the resulting feature map(s) to memory 430, e.g., another portion or partition of memory 430 or possibly another memory depending upon the particular implementation of the architecture illustrated in FIG. 4.

In one aspect, the architecture of FIG. 4 may loop through the input feature maps and update (e.g., scatter) the results of the corresponding output maps. In another aspect, the architecture of FIG. 4 may loop through the output feature maps and gather the contributions from all of the input feature maps. It should be appreciated that the example of FIG. 4 is provided for purposes of illustration only. The exemplary architecture of FIG. 4 is not intended to be limiting of the inventive arrangements disclosed within this specification.

Figure 5:
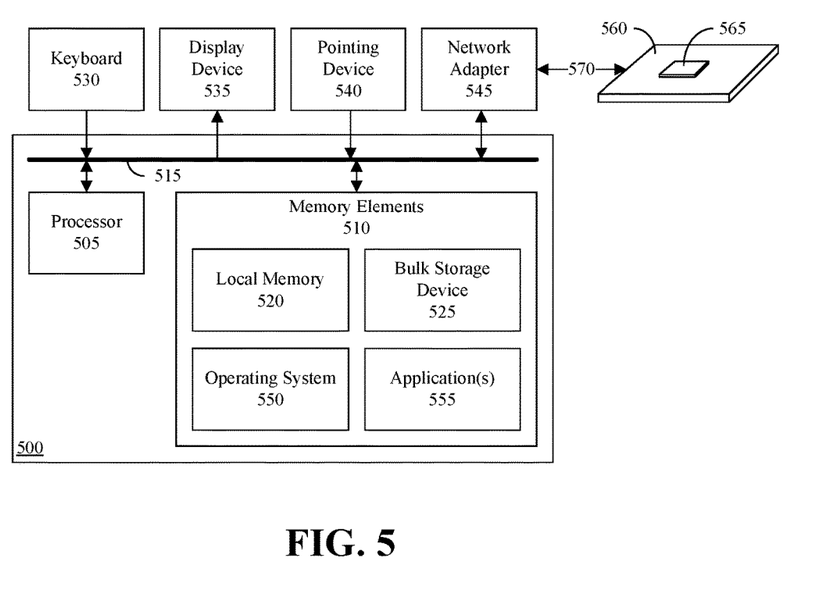
FIG. 5 is a block diagram illustrating an exemplary architecture for a data processing system.

FIG. 5 is a block diagram illustrating an exemplary architecture 500 for a data processing system. In one arrangement, architecture 500 may be used to implement neural network analyzer 105 of FIG. 1.

As pictured, architecture 500 includes at least one processor, e.g., a central processing unit (CPU), 505 coupled to memory elements 510 through a system bus 515 or other suitable circuitry. Architecture 500 stores program code within memory elements 510. Processor 505 executes the program code accessed from memory elements 510 via system bus 515. As such, processor 505 serves as a special processor. Memory elements 510 include one or more physical memory devices such as, for example, a local memory 520 and one or more bulk storage devices 525. Local memory 520 refers to random access memory (RAM) or other non-persistent memory device(s) generally used during actual execution of the program code. Bulk storage device 525 may be implemented as a hard disk drive (HDD), solid state drive (SSD), or other persistent data storage device. Architecture 500 may also include one or more cache memories (not shown) that provide temporary storage of at least some program code in order to reduce the number of times program code must be retrieved from bulk storage device 525 during execution.

Input/output (I/O) devices such as a keyboard 530, a display device 535, and a pointing device 540 may optionally be coupled to architecture 500. In some cases, one or more of the I/O devices may be combined as in the case where a touchscreen is used as display device 535. In that case, display device 535 may also implement keyboard 530 and pointing device 540.

One or more network adapters 545 may also be coupled to architecture 500 to enable architecture 500 to become coupled to other systems, computer systems, remote printers, and/or remote storage devices through intervening private or public networks. Modems, cable modems, Ethernet cards, and wireless transceivers are examples of different types of network adapter 545 that may be used with architecture 500. Depending upon the particular device implemented with architecture 500, the specific type of network adapter, or network adapters as the case may be, will vary. The I/O devices may be coupled to architecture 500 either directly or through intervening I/O controllers.

As pictured in FIG. 5, memory elements 510 store an operating system 550 and one or more applications 555. In one aspect, operating system 550 and application(s) 555, being implemented in the form of executable program code, are executed by architecture 500. As such, operating system 550 and application(s) 555 may be considered an integrated part of architecture 500. Operating system 550, application(s) 555, and any data items used, generated, and/or operated upon by architecture 500 are functional data structures that impart functionality when employed as part of a system implemented using architecture 500.

In one arrangement, application 555, when executed by a system using architecture 500 or an architecture similar to architecture 500, may perform the various operations described herein with reference to FIGS. 1-3.

In another arrangement, architecture 500 may be coupled to a platform 560 through a communication link 570. In one example, architecture 500 may be coupled to platform 560 through network adapter 545. In another example, architecture 500 may include one or more other I/O devices such as Universal Serial Bus (USB) interface, or other communication port that may be used to couple architecture 500 to platform 560. Platform 560 may be a circuit board and have a neural network accelerator 565 coupled thereto. In one arrangement, neural network accelerator 565 may be implemented as an integrated circuit (IC) or a plurality of ICs. For example, neural network accelerator 565 may be implemented as one or more programmable ICs such as field programmable gate arrays, one or more application-specific ICs (ASICs), or the like.

Architecture 500 may be configured to perform the operations described herein on a neural network to generate the modified neural network. Architecture 500 further may provide the modified neural network, e.g., a definition of the modified neural network, to neural network accelerator 565 for execution therein.

FIG. 5 is provided for purposes of illustration only and, as such, is not intended as a limitation of the inventive arrangements described herein. In some cases, the particular system implemented using architecture 500 may include fewer components or more components than shown. Further, the particular operating system and/or application(s) included may vary.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to a display or other peripheral output device, sending or transmitting to another system, exporting, or the like.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions (e.g., "program code") means any expression, in any language, code, or notation, of a set of instructions intended to cause a data processing system to perform a function either directly or after either or both of the following: conversion to another language, code, or notation; or reproduction in a different material form. Computer readable program instructions for carrying out operations for the inventive arrangements described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language and/or procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The corresponding structures, materials, acts, and equivalents of all means or step plus function elements that may be found in the claims below are intended to include any structure, material, or act for performing the function in combination with other claimed elements as specifically claimed.

A method may include determining, using a processor, a group including a plurality of convolution kernels of a convolution stage of a neural network, wherein the convolution kernels of the group are similar to one another, determining a base convolution kernel for the group, and determining scaling factors for a plurality of input feature maps processed by the group. The method may include modifying the convolution stage to calculate a composite input feature map using the scaling factors and apply the base convolution kernel to the composite input feature map.

Determining the group of convolution kernels may include determining a similarity metric between a first convolution kernel and a second convolution kernel and including the first convolution kernel and the second convolution kernel in the group responsive to determining that the similarity metric meets a similarity criterion.

Determining a similarity metric may include calculating a ratio of the first convolution kernel to the second convolution kernel and calculating a standard deviation for the ratio of the first convolution kernel and the second convolution kernel.

Determining the group of convolution kernels may include selecting a convolution kernel from among a plurality of convolution kernels that operate on the feature map as a primary convolution kernel and calculating a ratio of the primary convolution kernel to other convolution kernels of the plurality of convolution kernels not yet assigned to a group.

Determining the base convolution kernel for the group may include selecting a convolution kernel of the group as the base convolution kernel according to a base selection metric.

Determining the base convolution kernel for the group may include determining the base convolution kernel as a function of the convolution kernels of the group.

The method may include retraining the neural network including the modified convolution stage without permitting changes to membership in the group of convolution kernels.

The method may include executing the neural network including the modified convolution stage. Executing may include scaling each of the plurality of input feature maps using the scaling factors, generating the composite input feature map as a sum of the scaled input feature maps, and applying the base convolution kernel to the composite input feature map.

A system may include a processor programmed to initiate executable operations. The executable operations may include determining, using a processor, a group including a plurality of convolution kernels of a convolution stage of a neural network, wherein the convolution kernels of the group are similar to one another, determining a base convolution kernel for the group, and determining scaling factors for a plurality of input feature maps processed by the group. The executable operations may also include modifying the convolution stage to calculate a composite input feature map using the scaling factors and apply the base convolution kernel to the composite input feature map.

Determining the group of convolution kernels may include determining a similarity metric between a first convolution kernel and a second convolution kernel and including the first convolution kernel and the second convolution kernel in the group responsive to determining that the similarity metric meets a similarity criterion.

Determining a similarity metric may include calculating a ratio of the first convolution kernel to the second convolution kernel and calculating a standard deviation for the ratio of the first convolution kernel and the second convolution kernel.

Determining the group of convolution kernels may include selecting a convolution kernel from among a plurality of convolution kernels that operate on the feature map as a primary convolution kernel and calculating a ratio of the primary convolution kernel to other convolution kernels of the plurality of convolution kernels not yet assigned to a group.

Determining the base convolution kernel for the group may include selecting a convolution kernel of the group as the base convolution kernel according to a base selection metric.

Determining the base convolution kernel for the group may include determining the base convolution kernel as a function of the convolution kernels of the group.

The executable operations may include retraining the neural network including the modified convolution stage without permitting changes to membership in the group of convolution kernels.

The executable operations may also include executing the neural network including the modified convolution stage. Executing may include scaling each of the plurality of input feature maps using the scaling factors, generating the composite input feature map as a sum of the scaled input feature maps, and applying the base convolution kernel to the composite input feature map.

A non-transitory computer-readable storage medium has instructions stored thereon which, when executed by a processor, perform a method. The method may include determining, using the processor, a group including a plurality of convolution kernels of a convolution stage of a neural network, wherein the convolution kernels of the group are similar to one another, determining a base convolution kernel for the group, and determining scaling factors for a plurality of input feature maps processed by the group. The method may include modifying the convolution stage to calculate a composite input feature map using the scaling factors and apply the base convolution kernel to the composite input feature map.

Determining the group of convolution kernels may include determining a similarity metric between a first convolution kernel and a second convolution kernel and including the first convolution kernel and the second convolution kernel in the group responsive to determining that the similarity metric meets a similarity criterion.

Determining a similarity metric may include calculating a ratio of the first convolution kernel to the second convolution kernel and calculating a standard deviation for the ratio of the first convolution kernel and the second convolution kernel.

Determining the group of convolution kernels may include selecting a convolution kernel from among a plurality of convolution kernels that operate on the feature map as a primary convolution kernel and calculating a ratio of the primary convolution kernel to other convolution kernels of the plurality of convolution kernels not yet assigned to a group.

Determining the base convolution kernel for the group may include selecting a convolution kernel of the group as the base convolution kernel according to a base selection metric.

Determining the base convolution kernel for the group may include determining the base convolution kernel as a function of the base convolution kernels of the group.

The method may include retraining the neural network including the modified convolution stage without permitting changes to membership in the group of convolution kernels.

The method may include executing the neural network including the modified convolution stage. Executing may include scaling each of the plurality of input feature maps using the scaling factors, generating the composite input feature map as a sum of the scaled input feature maps, and applying the base convolution kernel to the composite input feature map.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
   determining, using a processor, a group comprising a plurality of convolution kernels of a convolution stage of a neural network in which the convolution kernels of the group are similar to one another, the determining of the group by:
   determining a similarity metric between a first convolution kernel and a second convolution kernel of the plurality of convolution kernels by calculating an element-wise ratio of the first convolution kernel to the second convolution kernel and calculating a standard deviation for the element-wise ratio of the first convolution kernel and the second convolution kernel; and including the first convolution kernel and the second convolution kernel in the group responsive to determining that the similarity metric meets a similarity criterion;

determining a base convolution kernel for the group;

determining scaling factors based on the base convolution kernel for the group for a plurality of input feature maps processed by the group, each input feature map corresponding to a scaling factor and a convolution kernel; and modifying the convolution stage of the neural network so that, when the neural network is executed, the convolution stage of the neural network performs:
  scaling each of a plurality of input feature maps using the scaling factors,
  generating a composite input feature map as a sum of the scaled input feature maps,
  applying the base convolution kernel to the composite input feature map, and
  summing the composite input feature map with any of a second plurality of input feature maps which are processed by a convolution kernel other than the base convolution kernel.

2. The method of claim 1, wherein determining the group of convolution kernels further comprises:
  selecting a convolution kernel from among a plurality of convolution kernels that operate on the feature map as a primary convolution kernel; and
  calculating an element-wise ratio of the primary convolution kernel to other convolution kernels of the plurality of convolution kernels not yet assigned to a group.

3. The method of claim 1, wherein determining the base convolution kernel for the group comprises:
  selecting a convolution kernel of the group as the base convolution kernel according to a base selection metric.

4. The method of claim 1, wherein determining the base convolution kernel for the group comprises:
  determining the base convolution kernel as a function of the convolution kernels of the group.

5. The method of claim 1, further comprising:
  retraining the neural network comprising the modified convolution stage without permitting changes to membership in the group of convolution kernels.

6. The method of claim 1, further comprising:
  executing the neural network comprising the modified convolution stage.

7. A system, comprising:
  a processor programmed to initiate executable operations comprising:
  determining a group comprising a plurality of convolution kernels of a convolution stage of a neural network in which the convolution kernels of the group are similar to one another, the determining of the group by:
  determining a similarity metric between a first convolution kernel and a second convolution kernel of the plurality of convolution kernels by calculating an element-wise ratio of the first convolution kernel to the second convolution kernel and calculating a standard deviation for the element-wise ratio of the first convolution kernel and the second convolution kernel; and
  including the first convolution kernel and the second convolution kernel in the group responsive to determining that the similarity metric meets a similarity criterion;

determining a base convolution kernel for the group;

determining scaling factors based on the base convolution kernel for the group for a plurality of input feature maps processed by the group, each input feature map corresponding to a scaling factor and a convolution kernel; and modifying the convolution stage of the neural network so that, when the neural network is executed, the convolution stage of the neural network performs:
  scaling each of a plurality of input feature maps using the scaling factors,
  generating a composite input feature map as a sum of the scaled input feature maps,
  applying the base convolution kernel to the composite input feature map, and
  summing the composite input feature map with any of a second plurality of input feature maps which are processed by a convolution kernel other than the base convolution kernel.

8. The system of claim 7, wherein determining the group of convolution kernels further comprises:
  selecting a convolution kernel from among a plurality of convolution kernels that operate on the feature map as a primary convolution kernel; and
  calculating an element-wise ratio of the primary convolution kernel to other convolution kernels of the plurality of convolution kernels not yet assigned to a group.

9. The system of claim 7, wherein determining the base convolution kernel for the group comprises:
  selecting a convolution kernel of the group as the base convolution kernel according to a base selection metric.

10. The system of claim 7, wherein determining the base convolution kernel for the group comprises:
  determining the base convolution kernel as a function of the convolution kernels of the group.

11. The system of claim 7, wherein the processor is further programmed to initiate executable operations comprising:
  retraining the neural network comprising the modified convolution stage without permitting changes to membership in the group of convolution kernels.

12. A non-transitory computer-readable storage medium having instructions stored thereon which, when executed by a processor, perform a method comprising:
  determining, using the processor, a group comprising a plurality of convolution kernels of a convolution stage of a neural network in which the convolution kernels of the group are similar to one another, the determining of the group by:
  determining a similarity metric between a first convolution kernel and a second convolution kernel of the plurality of convolution kernels by calculating an element-wise ratio of the first convolution kernel to the second convolution kernel and calculating a standard deviation for the element-wise ratio of the first convolution kernel and the second convolution kernel; and
  including the first convolution kernel and the second convolution kernel in the group responsive to determining that the similarity metric meets a similarity criterion;

determining a base convolution kernel for the group;

determining scaling factors based on the base convolution kernel for the group for a plurality of input feature maps processed by the group, each input feature map corresponding to a scaling factor and a convolution kernel; and modifying the convolution stage of the neural network so that, when the neural network is executed, the convolution stage of the neural network performs:
scaling each of a plurality of input feature maps using the scaling factors,
generating a composite input feature map as a sum of the scaled input feature maps,
applying the base convolution kernel to the composite input feature map, and
summing the composite input feature map with any of a second plurality of input feature maps which are processed by a convolution kernel other than the base convolution kernel.

13. The non-transitory computer-readable storage medium of claim 12, wherein determining the group of convolution kernels further comprises:
selecting a convolution kernel from among a plurality of convolution kernels that operate on the feature map as a primary convolution kernel; and
calculating an element-wise ratio of the primary convolution kernel to other convolution kernels of the plurality of convolution kernels not yet assigned to a group.

14. The non-transitory computer-readable storage medium of claim 12, wherein the method further comprises:
retraining the neural network comprising the modified convolution stage without permitting changes to membership in the group of convolution kernels.

* * * * *